United States Patent
Bakshi et al.

(10) Patent No.: US 9,779,733 B2
(45) Date of Patent: *Oct. 3, 2017

(54) REDUCING LATENCY CAUSED BY SWITCHING INPUT MODALITIES

(71) Applicant: Google Inc., Mountain View, CA (US)

(72) Inventors: Dhruv Bakshi, Zurich (CH); Zaheed Sabur, Adliswil (CH)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,128

(22) Filed: Sep. 2, 2016

(65) Prior Publication Data

US 2017/0068724 A1    Mar. 9, 2017

Related U.S. Application Data

(63) Continuation of application No. 14/849,389, filed on Sep. 9, 2015, now Pat. No. 9,443,519.

(51) Int. Cl.
| | |
|---|---|
| *G10L 15/26* | (2006.01) |
| *G10L 15/22* | (2006.01) |
| *G06F 17/27* | (2006.01) |
| *G06F 17/30* | (2006.01) |
| G06F 9/44 | (2006.01) |
| G10L 15/30 | (2013.01) |

(52) U.S. Cl.
CPC .......... *G10L 15/22* (2013.01); *G06F 17/2785* (2013.01); *G06F 17/30654* (2013.01);
(Continued)

(58) Field of Classification Search
CPC ....... G10L 15/22; G10L 15/30; G10L 15/265; G10L 15/02; G10L 15/08; G10L 15/10;
(Continued)

(56) References Cited

U.S. PATENT DOCUMENTS

| | | |
|---|---|---|
| 6,564,213 B1 | 5/2003 | Ortega et al. |
| 8,019,608 B2 | 9/2011 | Carraux et al. |

(Continued)

OTHER PUBLICATIONS

Deng, L., Wang, K., Acero, A., Hon, H. W., Droppo, J., Boulis, C., & Huang, X. D. (2002). Distributed Speech Processing in Mipad's Multimodal User Interface. Speech and Audio Processing, IEEE Transactions on, 10(8), 605-619.

(Continued)

*Primary Examiner* — Vu B Hang
(74) *Attorney, Agent, or Firm* — Middleton Reutlinger

(57) ABSTRACT

Methods, apparatus, and computer-readable media (transitory and non-transitory) are provided herein for reducing latency caused by switching input modalities. In various implementations, a first input such as text input may be received at a first modality of a multimodal interface provided by an electronic device. In response to determination that the first input satisfies one or more criteria, the electronic device may preemptively establish a session between the electronic device and a query processor configured to process input received at a second modality (e.g., voice input) of the multimodal interface. In various implementations, the electronic device may receive a second input (e.g., voice input) at the second modality of the multimodal interface, initiate processing of at least a portion of the second input at the query processor within the session, and build a complete query based on output from the query processor.

20 Claims, 5 Drawing Sheets

(52) U.S. Cl.
CPC .......... *G10L 15/265* (2013.01); *G06F 9/4448* (2013.01); *G10L 15/30* (2013.01); *G10L 2015/228* (2013.01)

(58) Field of Classification Search
CPC ..... G10L 15/12; G10L 15/063; G10L 15/187; G10L 15/183; G10L 17/005; G10L 17/02; G10L 25/87; G06F 17/2785; G06F 17/274
See application file for complete search history.

(56) References Cited

U.S. PATENT DOCUMENTS

| | | | |
|---|---|---|---|
| 8,249,876 | B1 | 8/2012 | Ainslie |
| 9,443,519 | B1* | 9/2016 | Bakshi ................ G06F 17/2785 |
| 2008/0282154 | A1 | 11/2008 | Nurmi |
| 2009/0287680 | A1 | 11/2009 | Paek et al. |
| 2012/0216134 | A1 | 8/2012 | Neubacher et al. |
| 2013/0046544 | A1* | 2/2013 | Kay .................... G06F 3/04883 704/275 |
| 2014/0244270 | A1 | 8/2014 | Han et al. |
| 2015/0100314 | A1* | 4/2015 | Phillips .................. G10L 15/30 704/235 |
| 2016/0055240 | A1* | 2/2016 | Tur ....................... G06F 17/277 707/706 |

OTHER PUBLICATIONS

Kurschl, W., Mitsch, S., Prokop, R. & Schonbock, J. (2007). Development Issues for Speech-Enabled Mobile Applications. In Software Engineering (pp. 157-168).

Kurschl, W., Mitsch, S., Prokop, R., & Schonbock, J. (Jan. 2007). Gulliver—A Framework for Building Smart Speech-Based Applications. In System Sciences, 2007. HICSS 2007. 40th Annual Hawaii International Conference on (pp. 30-30). IEEE.

Etzold, J. Brousseau, A., Grimm, P., & Steiner, T. (2012). Context-Aware Querying for Multimodal Search Engines (pp. 728-739). Springer Berlin Heidelberg.

Guan, Ling. (2011). Methods and Techniques for MultiModal Information Fusion. Ryerson University. Ontario Canada, (51 pages).

Kennedy, L., Chang, S. F., & Natsev, A. (2008). Query-Adaptive Fusion for Multimodal Search. Proceedings of the IEEE, 96(4), 567-588.

Chai, J. Y., Hong, P., & Zhou, M. X. (Jan. 2004). A Probabilistic Approach to Reference Resolution in Multimodal User Interfaces. In Proceedings of the 9th International Conference on Intelligent User Interfaces (pp. 10-77). ACM.

Vertanen, K., & Kristensson, P. O. (Sep. 2009). Recognition and Correction of Voice Web Search Queries. In Interspeech (pp. 1863-1866).

Goto, M., Itou, K., Kitayama, K., & Kobayashi, T. (2004). Speech-Recognition Interfaces for Music Information Retrieval: "Speech Completion" and "Speech Spotter". In in Proceedings of the 5th International Conference on Music Information Retrieval (ISMIR 2004).

Bar-Yossef, Z., & Kraus, N. (Mar. 2011). Context-Sensitive Query Auto-Completion. In Proceedings of the 20th International Conference on World Wide Web (pp. 107-116). ACM.

European Patent Office, Communication—European Search Report of Patent Application No. EP16185390.8; Feb. 21, 2017; DE; 5 pages.

* cited by examiner

REDUCING LATENCY CAUSED BY SWITCHING INPUT MODALITIES

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Such applications are generally characterized by non-traditional form factors that limit the utility of more traditional keyboard or touch screen inputs and/or usage in situations where it is desirable to encourage a user to remain focused on other tasks, such as when the user is driving or walking.

The computing resource requirements of a voice-based user interface, e.g., in terms of processor and/or memory resources, can be substantial. As a result, some conventional voice-based user interface approaches employ a client-server architecture where voice input is received and recorded by a relatively low-power client device, the recording is transmitted over a network such as the Internet to an online service for voice-to-text conversion and semantic processing, and an appropriate response is generated by the online service and transmitted back to the client device. Online services can devote substantial computing resources to processing voice input, enabling more complex speech recognition and semantic analysis functionality to be implemented than could otherwise be implemented locally within a client device. However, a client-server approach necessarily requires that a client be online (i.e., in communication with the online service) when processing voice input. Maintaining connectivity between such clients and online services may be impracticable, particularly in mobile and automotive applications where a wireless signal strength will no doubt fluctuate. Accordingly, when it is desired to convert voice input into text using an online service, a voice-to-text conversion session must be established between the client and the server. A user may experience significant latency while such a session is established, e.g., 1-2 seconds or more, which may detract from the user experience.

SUMMARY

This specification is directed generally to various implementations that facilitate reduction and/or elimination of latency experienced by a user when switching between input modalities, especially where the user switches from a low latency input modality to a high latency input modality. For example, in some implementations, a voice-to-text conversion session may be preemptively established when circumstances indicate that a user providing input via a lower latency input modality (e.g., text) is likely to switch to voice input.

Therefore, in some implementations, a method may including the following operations: receiving a first input at a first modality of a multimodal interface associated with an electronic device; and in the electronic device, and responsive to receiving the first input: determining that the first input satisfies a criterion; in response to determining that the first input satisfies a criterion, preemptively establishing a session between the electronic device and a query processor configured to process input received at a second modality of the multimodal interface; receiving a second input at the second modality of the multimodal interface; initiating processing of at least a portion of the second input at the query processor within the session; and building a complete query based on output from the query processor.

In some implementations, a method may include the following operations: receiving a text input with a voice-enabled device; and in the voice-enabled device, and responsive to receiving the text input: determining that the text input satisfies a criterion; in response to a determination that the text input satisfies a criterion, preemptively establishing a voice-to-text conversion session between the voice-enabled device and a voice-to-text conversion processor; receiving a voice input; initiating processing of at least a portion of the voice input at the voice-to-text conversion processor within the session; and building a complete query based on output from the voice-to-text conversion processor.

In various implementations, the voice-to-text conversion processor may be an online voice-to-text conversion processor, and the voice-enabled device may include a mobile device configured to communicate with the online voice-to-text conversion processor when in communication with a wireless network. In various implementations, initiating processing includes sending data associated with the text input and data associated with the voice input to the online voice-to-text conversion processor. In various implementations, sending the data may include sending at least a portion of a digital audio signal of the voice input. In various implementations, the online voice-to-text conversion processor may be configured to perform voice-to-text conversion and semantic processing of the portion of the digital audio signal based on the text input to generate the output.

In various implementations, building the complete query may include combining the output with at least a portion of the text input. In various implementations, the output from the voice-to-text conversion processor may include a plurality of candidate interpretations of the voice input, and building the complete query comprises ranking the plurality of candidate interpretations based at least in part on the text input. In various implementations, preemptively initiating a voice-to-text conversion session may include activating a microphone of the voice-enabled device. In various implementations, the method may further include providing output to indicate that the voice-to-text conversion session is available. In various implementations, the criterion may include the text input satisfying a character count or word count threshold. In various implementations, the criterion may include the text input matching a particular language.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, an application executing on a resource-constrained electronic device such as a mobile computing device (e.g., a smart phone or smart watch) may provide a so-called "multimodal" interface that supports multiple different input modalities. These input modalities may include low latency inputs, such as text, that are responsive to user input without substantial delay, and high latency inputs, such as voice recognition, which exhibit higher latency because they require various latency-inducing routines to occur, such as establishment of a session with a conversion processor that is configured to convert input received via the high latency modality to a form that matches a lower latency input modality. To reduce latency (or at least perceived latency) when a user switches from providing a first, low latency input (e.g., text input) to a second, higher latency input (e.g., voice), the electronic device may preemptively establish a session with a conversion processor, e.g., in response to a determination that a first input satisfies one or more criteria. The electronic device is thereby able to immediately initiate processing of the second input by the conversion processor, rather than being required to establish a session first, significantly decreasing delay experienced by a user when switching input modalities.

Further details regarding selected implementations are discussed hereinafter. It will be appreciated however that other implementations are contemplated so the implementations disclosed herein are not exclusive.

Figure 1:
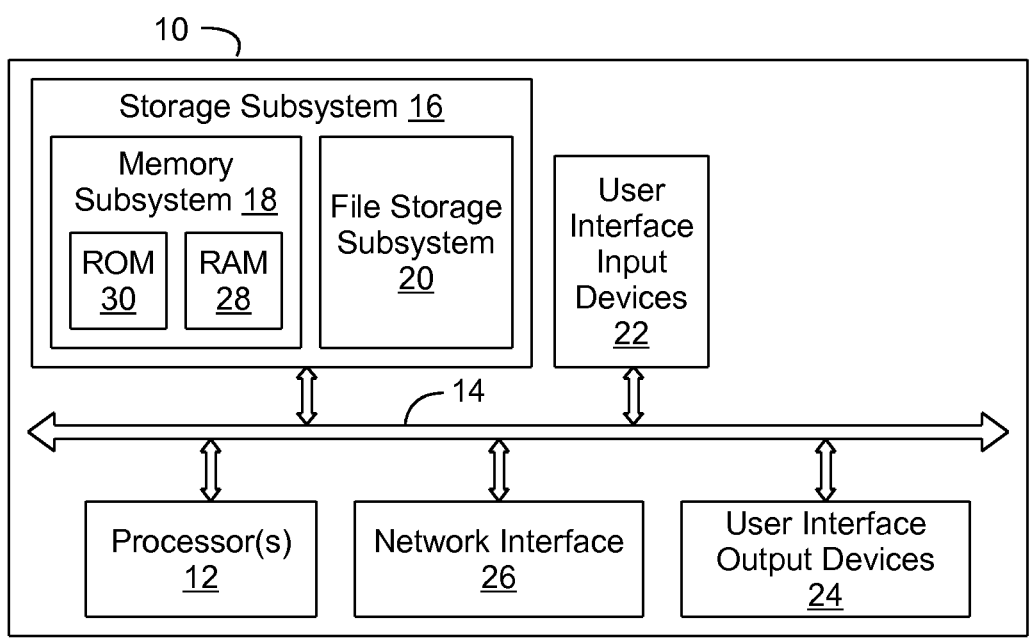
FIG. 1 illustrates an example architecture of a computer system.

Now turning to the drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Figure 2:
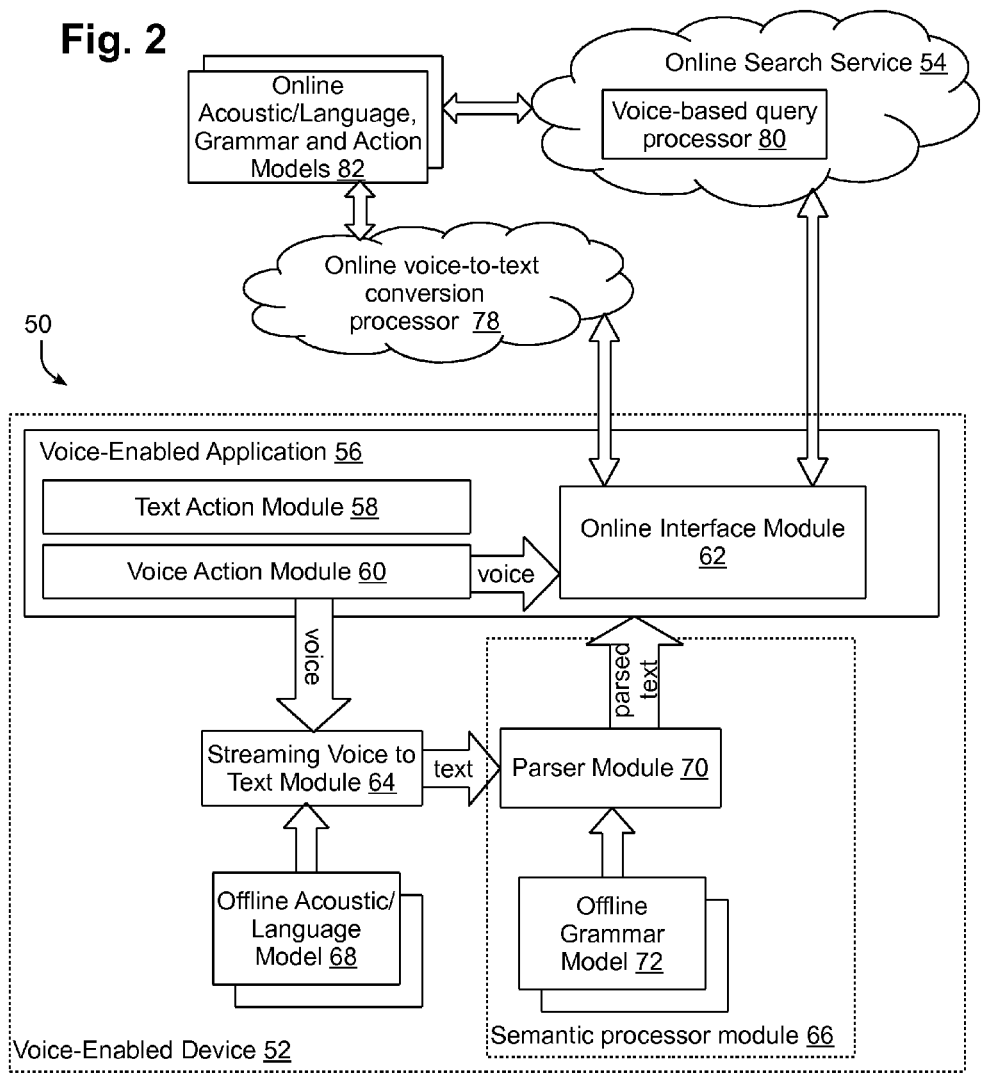
FIG. 2 is a block diagram of an example distributed voice input processing environment.

FIG. 2 illustrates an example distributed voice input processing environment 50, e.g., for use with a voice-enabled device 52 in communication with one or more online services such as online search service 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Voice-enabled device 52 may be operated to communicate with a variety of online services. One non-limiting example is online search service 54. In some implementations, online search service 54 may be implemented as a cloud-based service employing a cloud infrastructure, e.g., using a server farm or cluster of high performance computers running software suitable for handling high volumes of requests from multiple users. In the illustrated implementation, online search service 54 is capable of querying one or more databases to locate requested information, e.g., to provide a list of web sites including requested information. Online search service 54 may not be limited to voice-based searches, and may also be capable of handling other types of searches, e.g., text-based searches, image-based searches, etc.

Voice-enabled device 52 may communicate with other online systems (not depicted) as well, and these other online systems need not necessarily handle searching. For example, some online systems may handle voice-based requests for non-search actions such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based queries, regardless of whether the voice-based queries seek to initiate a search, pose a question, issue a command, dictate an email or text message, etc. In general, therefore, any voice input, e.g., including one or more words or phrases, may be considered to be a voice-based query within the context of the illustrated implementations.

In the implementation of FIG. 2, voice input received by voice-enabled device 52 is processed by a voice-enabled search application (or "app") 56. In other implementations, voice input may be handled within an operating system or firmware of a voice-enabled device. Application 56 in the illustrated implementation provides a multimodal interface that includes a text action module 58, a voice action module 60, and an online interface module 62. While not depicted in FIG. 2, application 56 may also be configured to accept input using input modalities other than text and voice, such as motion (e.g., gestures made with phone), biometrics (e.g., retina input, fingerprints, etc.), and so forth.

Text action module 58 receives text input directed to application 56 and performs various actions, such as populating one or more rendered input fields of application 56 with the provided text. Voice action module 60 receives voice input directed to application 56 and coordinates the analysis of the voice input. Voice input may be analyzed locally (e.g., by components 64-72 as described below) or remotely (e.g., by a standalone online voice-to-text conversion processor 78 or voice-based query processor 80 as described below). Online interface module 62 provides an interface with online search service 54, as well as with standalone online voice-to-text conversion processor 78 and voice-based query processor 80.

If voice-enabled device 52 is offline, or if its wireless network signal is too weak and/or unreliable to delegate voice input analysis to an online voice-to-text conversion processor (e.g., 78, 80), application 56 may rely on a local voice-to-text conversion processor to handle voice input. A local voice-to-text conversion processor may include various middleware, framework, operating system and/or firmware modules. In FIG. 2, for instance, a local voice-to-text conversion processor includes a streaming voice-to-text module 64 and a semantic processor module 66 equipped with a parser module 70.

Streaming voice-to-text module 64 receives an audio recording of voice input, e.g., in the form of digital audio data, and converts the digital audio data into one or more text words or phrases (also referred to herein as tokens). In the illustrated implementation, module 64 takes the form of a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 68, which together model a relationship between an audio signal and phonetic units in a language, along with word sequences in the language. In some implementations, a single model 68 may be used, while in other implementations, multiple models may be supported, e.g., to support multiple languages, multiple speakers, etc.

Whereas module 64 converts speech to text, semantic processor module 66 attempts to discern the semantics or meaning of the text output by module 64 for the purpose or formulating an appropriate response. Parser module 70, for example, relies on one or more offline grammar models 72 to map interpreted text to various structures, such as sentences, questions, and so forth. Parser module 70 may provide parsed text to application 56, as shown, so that application 56 may, for instance, populate an input field and/or provide the text to online interface module 62. In some implementations, a single model 72 may be used, while in other implementations, multiple models may be supported. It will be appreciated that in some implementations, models 68 and 72 may be combined into fewer models or split into additional models, as may be functionality of modules 64 and 66. Moreover, models 68 and 72 are referred to herein as offline models insofar as the models are stored locally on voice-enabled device 52 and are thus accessible offline, when device 52 is not in communication with online search service 54.

If, on the other hand, voice-enabled device 52 is online, or if its wireless signal is sufficiently strong and/or reliable to delegate voice input analysis to an online voice-to-text conversion processor (e.g., 78, 80), application 56 may rely on remote functionality for handling voice input. This remote functionality may be provided by various sources, such as standalone online voice-to-text conversion processor 78 and/or a voice-based query processor 80 associated with online search service 54, either of which may rely on various acoustic/language, grammar, and/or action models 82. It will be appreciated that in some implementations, particularly when voice-enabled device 52 is a resource-constrained device, online voice-to-text conversion processor 78 and/or voice-based query processor 80, as well as models 82 used thereby, may implement more complex and computational resource-intensive voice processing functionality than is local to voice-enabled device 52. In other implementations, however, no complementary online functionality may be used.

In some implementations, both online and offline functionality may be supported, e.g., such that online functionality is used whenever a device is in communication with an online service, while offline functionality is used when no connectivity exists. In other implementations, online functionality may be used only when offline functionality fails to adequately handle a particular voice input.

Figure 3:
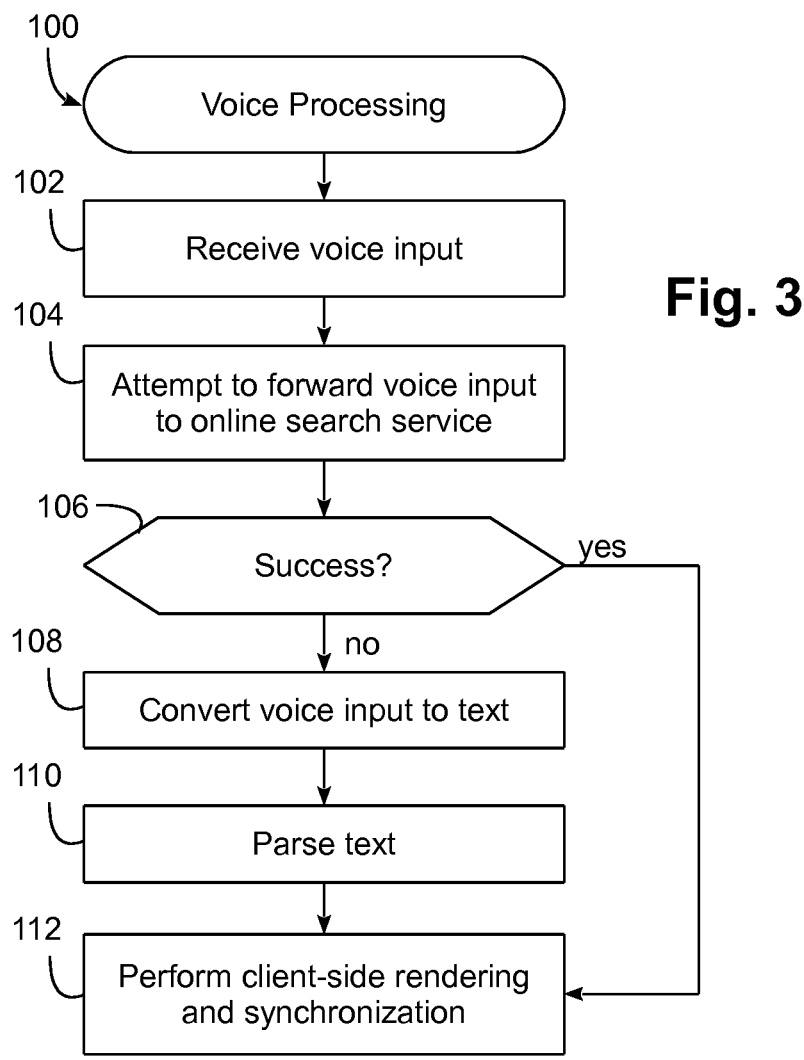
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. At block 104, an initial attempt is made to forward the voice input to the online search service. If unsuccessful, e.g., due to the lack of connectivity or the lack of a response from the online voice-to-text conversion processor 78, block 106 passes control to block 108 to convert the voice input to text tokens (e.g., using module 64 of FIG. 2), and parse the text tokens (block 110, e.g., using module 70 of FIG. 2), and processing of the voice input is complete.

Returning to block 106, if the attempt to forward the voice input to the online search service is successful, block 106 bypasses blocks 108-110 and passes control directly to block 112 to perform client-side rendering and synchronization. Processing of the voice input is then complete. It will be appreciated that in other implementations, offline processing may be attempted prior to online processing, e.g., to avoid unnecessary data communications when a voice input can be handled locally.

As noted in the background, a user may experience a delay when switching input modalities, especially where the user switches from a low latency input modality such as text to a high latency input modality such as voice. For example, suppose a user wishes to submit a search query to online search service 54. The user may being by typing text into a text input of voice-enabled device 52, but may decide that typing is too cumbersome, or may become distracted (e.g., by driving) such that the user can no longer type text efficiently. In existing electronic devices such as smart phones, the user would be required to press a button or touchscreen icon to activate a microphone and initiate establishment of a session with a voice-to-text conversion processor implemented locally on voice-enabled device 52 or online at a remote computing system (e.g., 78 or 80). Establishing such a session may take time, which can detract from the user experience. For example, establishing a session with online voice-to-text conversion processor 78 or online voice-based query processor 80 may require as much as one to two seconds or more, depending on the strength and/or reliability of an available wireless signal available.

To reduce or avoid such a delay, and using techniques described herein, voice-enabled device 52 may preemptively establish a session with a voice-to-text conversion processor, e.g., while the user is still typing the first part of her query using a keypad. By the time the user decides to switch to voice, the session may already be established, or at least establishment of the session may be underway. Either way, the user can immediately, or at least relatively quickly, begin speaking. Voice-enabled device 52 may respond with little to no perceived latency.

Figure 4:
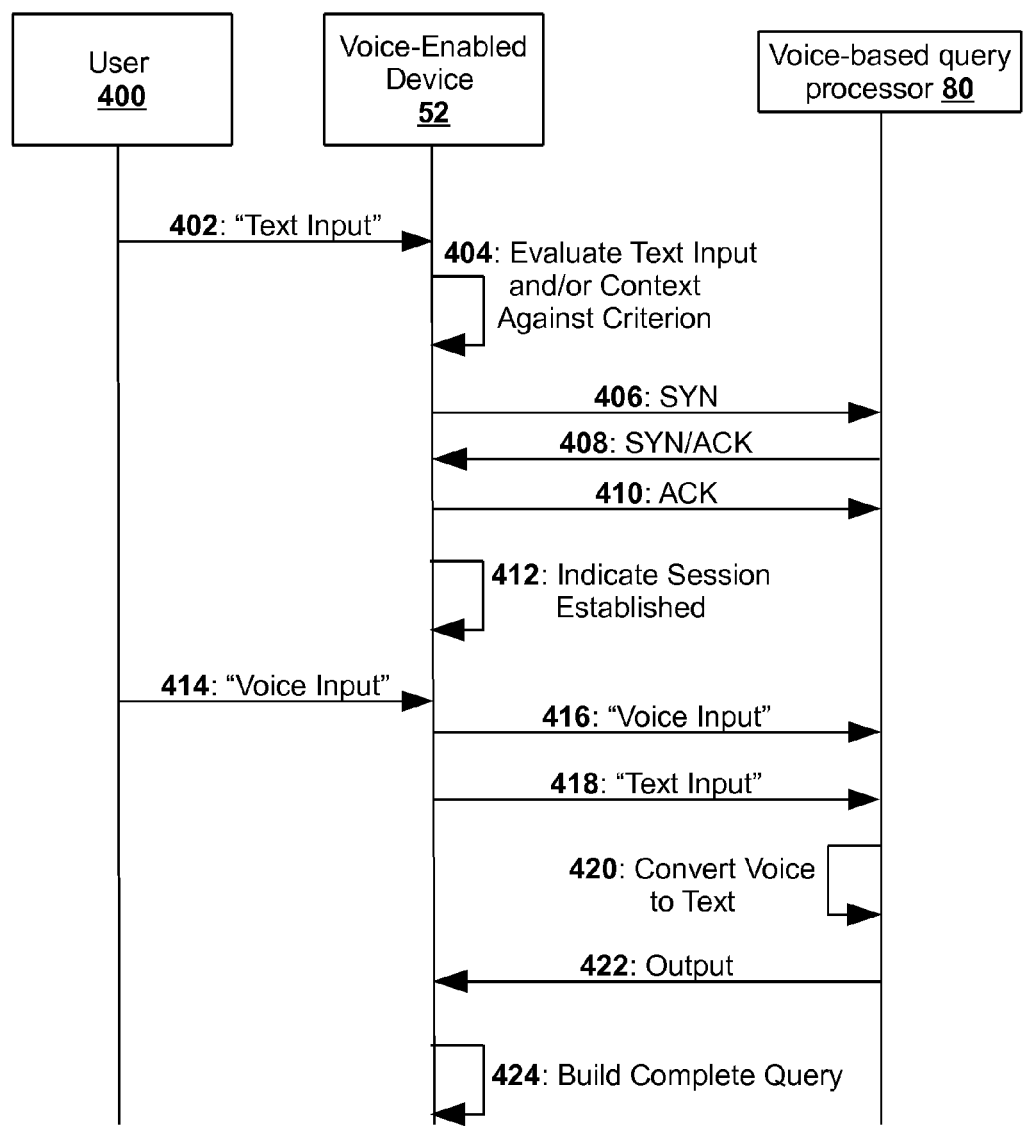
FIG. 4 illustrates an example exchange of communications that may occur between various entities configured with selected aspects of the present disclosure, in accordance with various implementations.

FIG. 4 depicts an example of communications that may be exchanged between an electronic device such as voice-enabled device 52 and a voice-to-text conversion processor such as voice-based query processor 80, in accordance with various implementations. This particular example depicts a scenario in which a session is established between voice-enabled device 52 and online voice-based query processor 80. However, this is not meant to be limiting. Similar communications may be exchanged between voice-enabled device 52 and standalone online voice-to-text conversion processor 78. Additionally or alternatively, similar communications may be exchanged between internal modules of a suitably-equipped voice-enabled device 52. For instance, when voice-enabled device 52 is offline (and the operations of blocks 108-112 of FIG. 3 are performed), various internal components of voice-enabled device 52, such as one or more of streaming voice-to-text module 64 and/or semantic processor module 66, may collectively perform a role similar to that performed by online voice-based query processor 80 in FIG. 4 (except that some aspects, such as the depicted handshake procedure, may be simplified or omitted). A user 400 of voice-enabled device 52 is depicted schematically as well.

At 402, text input may be received at voice-enabled device 52 from user 400. For example, user 400 may begin a search by typing text at a physical keypad or a graphical keypad rendered on a touchscreen. At 404, voice-enabled device 52 may evaluate the text input and/or a current context of voice-enabled device 52 to determine whether various criteria are satisfied. If the criteria are satisfied, voice-enabled device 52 may establish a voice-to-text conversion session with voice-based query processor 80. In FIG. 4, this process is indicated at 406-410 as a three way handshake. However, other handshake procedures or session establishment routines may be used instead. At 412, voice-enabled device 52 may provide some sort of output indicating that the session is established, so that user 400 will know that he or she can begin speaking instead of typing.

Various criteria may be used to evaluate the text input received by voice-enabled device 52 at 402. For example, length-based criteria, such as a character or word count of the text input received to that point, may be compared to a length-based threshold (e.g., a character or word count threshold). Satisfaction of the character/word count threshold may suggest that the user likely will become weary of typing and will switch to voice input. Additionally or alternatively, the text input may be compared to various grammars to determine a matching language (e.g., German, Spanish, Japanese, etc.) of the text input. Some languages may include long words that users would be more likely to switch input modalities (e.g., text to voice) to complete. Additionally or alternatively, it may be determined whether the text input matches one or more patterns, e.g., regular expressions or other similar mechanisms.

In some implementations, in addition to or instead of evaluating text input against various criterion, a context of voice-enabled device 52 may be evaluated. If a context of voice-enabled device 52 is "driving," it may be highly likely that a user will want to switch from text input to voice input. A "context" of voice-enabled device 52 may be determined based on a variety of signals, including but not limited to sensor signals, user preferences, search history, and so forth. Examples of sensors that may be used to determine context include but are not limited to position coordinate sensors (e.g., global positioning system, or "GPS"), accelerometers, thermometers, gyroscopes, light sensors, and so forth. User preferences and/or search history may indicate circumstances under which the user prefers and/or tends to switch input modalities when providing input.

Referring back to FIG. 4, sometime after indicating to the user that the session is established at 412, at 414, voice-enabled device 52 may receive, from user 400, voice input. For example, the user may stop typing text input and may start speaking into a microphone and/or mouthpiece of voice-enabled device 52. Voice-enabled device 52 may then initiate, within the session established at 406-410, online processing of at least a portion of the voice input at online voice-based query processor 80. For example, at 416, voice-enabled device 52 may send at least a portion of a digital audio signal of the voice input to online voice-based query processor 80. In some implementations, at 418, voice-enabled device 52 may also send data associated with the text input received at 402 to online voice-based query processor 80.

At 420, online voice-based query processor 80 may perform voice-to-text conversion and/or semantic processing of the portion of the digital audio signal to generate output text. In some implementations, online voice-based query processor 80 may generate the output further based on the text input it received at 418. For example, online voice-based query processor 80 could be biased by the text input it receives at 418. Suppose a user speaks the word "socks" into a microphone of voice-enabled device 52. Without any other information, the user's spoken voice input speech might simply interpreted by online voice-based query processor 80 as "socks." However, if online voice-based query processor 80 considers text input of "red" that proceeded the voice input, online voice-based query processor 80 may be biased towards interpreting the spoken word "socks" as "Sox" (as in "Boston Red Sox").

As another example, a language of the text input could bias online voice-based query processor 80 towards a particular interpretation. For example, some languages, like German, have relatively long words. If online voice-based query processor 80 determines that the text input is in German, online voice-based query processor 80 may be more likely to concatenate text interpreted from the voice input with the text input, rather than separating them as separate words/tokens.

In addition to text input, online voice-based query processor 80 may consider other signals, such as the user's context (e.g., a user located in New England would be far more likely to be referring to the Red Sox than, say, a user in Japan), a user's accent (e.g., a Boston accent may significantly increase the odds of interpreting "socks" as "Sox"), a user's search history, and so forth.

Referring back to FIG. 4, at 422, online voice-enabled query processor 80 may provide output text to voice-enabled device 52. This output may come in various forms. In implementations in which text input and/or a context of voice-enabled device 52 is provided to voice-based query processor 80, voice-based query processor 80 may return a "best" guess as to text that corresponds to the voice input received by voice-enabled device 52 at 414. In other implementations, online voice-based query processor 80 may output or return a plurality of candidate interpretations of the voice input.

Whatever form of output is provided by online voice-based query processor 80 to voice-enabled device 52, at 424, voice-enabled device 52 may use the output to build a complete query that may be submitted to, for instance, online search service 54. For example, in implementations in which online voice-based query processor 80 provides a single best guess, voice-enabled device 52 may incorporate the best guess as one token in a multi-token query that also includes the original text input. Or, if the text input appears to be a first portion of a relatively long word (especially when the word is in a language like German), voice-enabled device 52 may concatenate the best guess of online voice-based query processor 80 directly with the text input to form a single word. In implementations in which online voice-based query processor 80 provides multiple candidate interpretations, voice-enabled device 52 may rank the candidate interpretations based on a variety of signals, such as one or more attributes of text input received at 402 (e.g., character count, word count, language, etc.), a context of voice-enabled device 52, and so forth, so that voice-enabled device 52 may select the "best" candidate interpretation.

While examples described herein have primarily pertained to a user switching from text input to voice input, this is not meant to be limiting. In various implementations, techniques described herein may be employed when a user switches between any input modalities, and especially where the user switches from a low latency input modality to a high latency input modality. For example, an electronic device may provide a multimodal interface, which may be an interface such as a webpage or application interface (e.g., text messaging application, web search application, social networking application, etc.) that is capable of accepting multiple different types of input. Suppose first input is received at a low latency first modality of the multimodal interface provided by the electronic device. The electronic device may be configured to preemptively establish a session between the electronic device and a conversion processor (e.g., online or local) that is configured to process input received at a high latency second modality of the multimodal interface. This may be performed, for instance, in response to a determination that the first input satisfies a criterion. Then, when a second input is received at the second modality of the multimodal interface, the electronic device may be ready to immediately or very quickly initiate processing of at least a portion of the second input at the conversion processor within the session. This may reduce or eliminate latency experienced by the user when switching from the first input modality to the second input modality.

Figure 5:
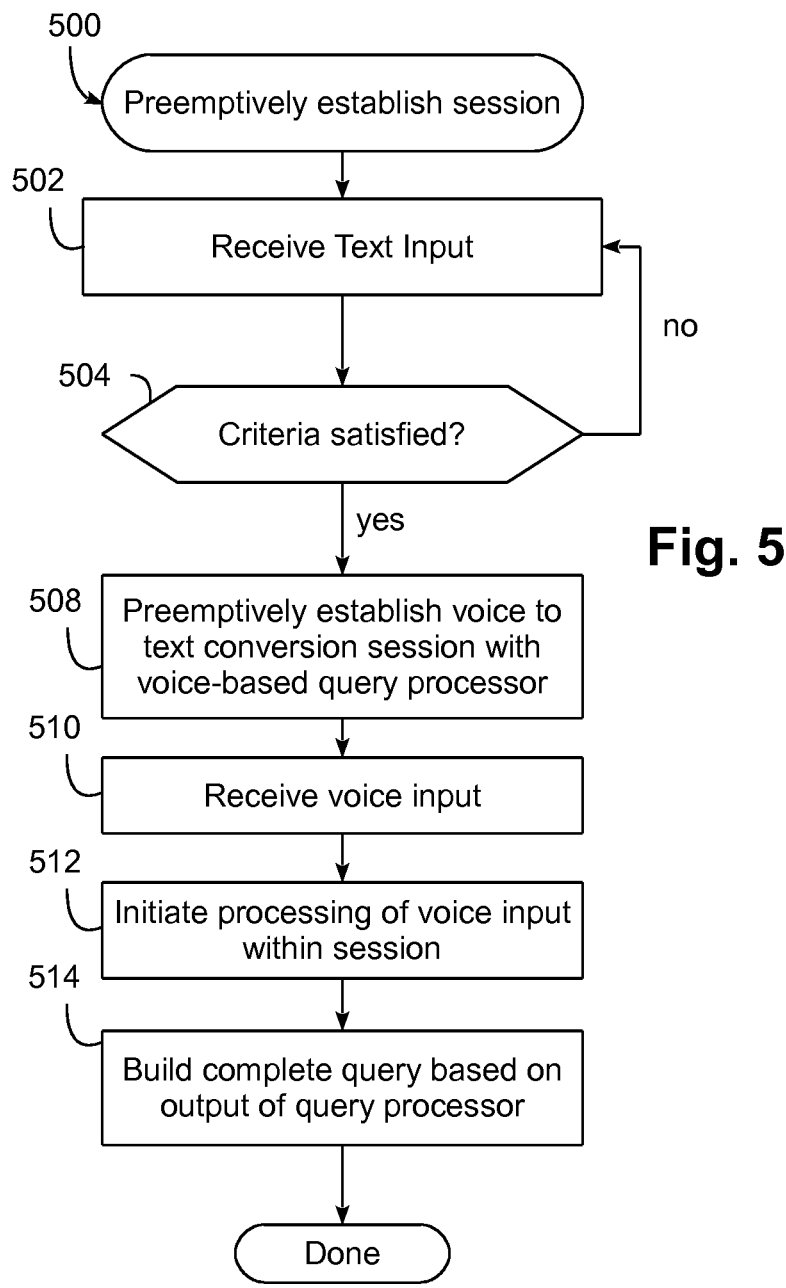
FIG. 5 is a flowchart illustrating an example method of preemptively establishing a voice-to-text session, in accordance with various implementations.

FIG. 5 illustrates a routine 500 that may be executed by voice-enabled device 52 to preemptively establish a voice-to-text conversion session with a voice-to-text conversion processor (online or local), in accordance with various implementations. Routine 500 begins in block 502 by receiving text input. At block 504, the text input may be analyzed against one or more criteria to determine whether to preemptively establish a voice-to-text conversion session. On determination that the one or more criteria are satisfied, at block 508, voice-enabled device 52 may establish the aforementioned voice-to-text conversion session, either with a voice-to-text conversion processor comprising components local to voice-enabled device (e.g., 64-72) or an online voice-to-text conversion processor, such as 78 or 80. At block 510, voice input may be received, e.g., at a microphone of voice-enabled device 52. At block 512, voice-enabled device 52 may initiate processing of the voice input received at block 510 within the session established at 508. At block 514, a complete query may be built based at least on output provided by the voice-based query processor with which the session was established at block 508. After that, the complete query may be used however the user wishes, e.g., as a search query submitted to online search service 54, or as part of a textual communication (e.g., text message, email, social media post) to be sent by the user.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
   receiving a first input at a first modality of a multimodal interface associated with an electronic device;
   determining that a context of the electronic device satisfies a criterion; and
   in the electronic device, and responsive to receiving the first input and determining that the context of the electronic device satisfies the criterion:
      preemptively establishing a session between the electronic device and a query processor configured to process input received at a second modality of the multimodal interface;
      receiving a second input at the second modality of the multimodal interface;
      initiating processing of at least a portion of the second input at the query processor within the session; and
      building a complete query based on output from the query processor.

2. The method of claim 1, wherein determining that the context of the electronic device satisfies the criterion comprises:
   determining the context based on one or more signals from a sensor of the electronic device.

3. The method of claim 2, wherein the sensor is an accelerometer.

4. The method of claim 1, wherein building the complete query comprises:
   combining the output with at least a portion of the first input.

5. The method of claim 1, wherein the output from the query processor includes a plurality of candidate interpretations of the second input, and wherein building the complete query comprises:
   ranking the plurality of candidate interpretations based at least in part on the first input.

6. The method of claim 1, wherein the query processor is an online query processor, and wherein the electronic device comprises a mobile device configured to communicate with the online query processor when in communication with a wireless network.

7. The method of claim 1, wherein initiating processing comprises:
   sending data associated with the first input and data associated with the second input to the query processor.

8. The method of claim 1, further comprising providing output to indicate that the session between the electronic device and the query processor is available.

9. The method of claim 1, further comprising providing the complete query to a search service.

10. The method of claim 1, further comprising using the query for one or more non-search actions.

11. The method of claim 10, wherein the one or more non-search actions include initiating communication with another user.

12. The method of claim 10, wherein the one or more non-search actions include setting a reminder.

13. An electronic device comprising:
   a sensor;
   memory storing instructions;
   one or more processors configured to execute the instructions to:
      receive a first input at a first modality of a multimodal interface associated with the electronic device;
      determine, based on one or more signals from the sensor, that a context satisfies a criterion; and
      responsive to receiving the first input and determining that the context satisfies the criterion:
         preemptively establish a session with a query processor configured to process input received at a second modality of the multimodal interface;
         receive a second input at the second modality of the multimodal interface;
         initiate processing of at least a portion of the second input at the query processor within the session; and
         build a complete query based on output from the query processor.

14. A method comprising:
receiving a first input at a first modality of a multimodal interface associated with an electronic device;
responsive to receiving the first input, determining that a criterion is satisfied;
in response to determining the criterion is satisfied, pre-emptively establishing a session between the electronic device and a query processor configured to process input received at a second modality of the multimodal interface;
receiving a second input at the second modality of the multimodal interface;
initiating processing of at least a portion of the second input at the query processor within the session; and
building a complete query based on output from the query processor, wherein the output from the query processor includes a plurality of candidate interpretations of the second input, and wherein building the complete query comprises:
ranking the plurality of candidate interpretations based at least in part on the first input.

15. The method of claim 14, wherein determining that the criterion is satisfied comprises determining that the first input satisfies the criterion.

16. The method of claim 15, wherein the criterion comprises the first input satisfying a character count threshold.

17. The method of claim 15, wherein the criterion comprises the first input satisfying a word count threshold.

18. The method of claim 14, wherein the query processor is an online query processor, and wherein the electronic device comprises a mobile device configured to communicate with the online query processor when in communication with a wireless network.

19. The method of claim 14, wherein initiating processing comprises:
sending data associated with the first input and data associated with the second input to the query processor.

20. The method of claim 14, further comprising providing output to indicate that the session between the electronic device and the query processor is available.

\* \* \* \* \*